(12) United States Patent
Urakami

(10) Patent No.: US 11,161,133 B2
(45) Date of Patent: Nov. 2, 2021

(54) SURFACE ADHERING MOBILE COATING APPARATUS

(71) Applicant: URAKAMI LLC, Kanagawa (JP)

(72) Inventor: Fukashi Urakami, Kanagawa (JP)

(73) Assignee: URAKAMI LLC, Kanagawa (JP)

( * ) Notice: Subject to any disclaimer, the term of this patent is extended or adjusted under 35 U.S.C. 154(b) by 33 days.

(21) Appl. No.: 16/414,845

(22) Filed: May 17, 2019

(65) Prior Publication Data

US 2019/0270110 A1 Sep. 5, 2019

Related U.S. Application Data

(63) Continuation of application No. PCT/JP2017/039841, filed on Nov. 4, 2017.

(30) Foreign Application Priority Data

Nov. 30, 2016 (JP) .............................. JP2016-233391

(51) Int. Cl.
| | |
|---|---|
| *B05B 12/02* | (2006.01) |
| *B05B 13/04* | (2006.01) |
| *B25J 5/00* | (2006.01) |
| *B62D 57/024* | (2006.01) |
| *B05B 12/00* | (2018.01) |
| *B62D 57/02* | (2006.01) |

(52) U.S. Cl.
CPC .............. *B05B 12/02* (2013.01); *B05B 12/00* (2013.01); *B05B 13/04* (2013.01);
(Continued)

(58) Field of Classification Search
USPC ........ 118/300, 305, 712, 699, 700, 702–705, 118/321, 323
See application file for complete search history.

(56) References Cited

U.S. PATENT DOCUMENTS

| | | | | |
|---|---|---|---|---|
| 5,486,067 A | * | 1/1996 | Huynh | .................. E01C 23/222 |
| | | | | 118/697 |
| 5,968,271 A | * | 10/1999 | Maxwell | ............... B05B 13/005 |
| | | | | 118/671 |

(Continued)

FOREIGN PATENT DOCUMENTS

| | | |
|---|---|---|
| JP | 2689127 B | 8/1997 |
| JP | 2805614 B | 7/1998 |

(Continued)

OTHER PUBLICATIONS

International Search Report for the PCT patent application No. PCT/JP2017/039841 issued by ISA/JPO dated Apr. 17, 2018.

*Primary Examiner* — Yewebdar T Tadesse
(74) *Attorney, Agent, or Firm* — Kubotera & Associates, LLC

(57) ABSTRACT

A surface adhering mobile coating apparatus includes a surface adhering and traveling device, a spray nozzle, and a spray nozzle X-axis drive device, and a spray nozzle Y-axis drive device. An operation procedure of the coating includes, regarding the timing at which the spray command of the coating material is triggered to the spray nozzle when the spray nozzle is moved from the start point to the end point in the forward or return direction on the X-axis, the timing is the trigger timing at which the spray nozzle leaves the start point in the forward or return direction on the X-axis, therefore, the timing at which the spray is actually started is slightly delayed from the time when the spray nozzle leaves the start point; regarding the timing at which the spray stop command of the coating material is triggered to the spray nozzle when the spray nozzle is moved from the start point to the end point in the forward or return direction on the X-axis, the timing is the trigger timing at which the spray nozzle reaches the part just before the end point in the forward or return direction on the X-axis, therefore, the (Continued)

timing at which the spray is actually stopped is slightly delayed from the time when the spray nozzle reaches the part just before the end point.

6 Claims, 15 Drawing Sheets

(52) U.S. Cl.
CPC ............ B05B 13/0405 (2013.01); B25J 5/00 (2013.01); B62D 57/02 (2013.01); B62D 57/024 (2013.01)

(56) References Cited

U.S. PATENT DOCUMENTS

| | | | |
|---|---|---|---|
| 7,846,046 B2 * | 12/2010 | Greenberg | ........... A63C 19/065 |
| | | | 473/467 |
| 2002/0168479 A1 * | 11/2002 | Manning | ............. B05B 13/0431 |
| | | | 427/9 |
| 2011/0059255 A1 * | 3/2011 | Ogonowski | ........... B05B 7/0031 |
| | | | 427/422 |
| 2014/0205744 A1 * | 7/2014 | McNutt | ................... E01C 23/22 |
| | | | 427/8 |
| 2016/0089691 A1 | 3/2016 | Fischer et al. | |

FOREIGN PATENT DOCUMENTS

| | | |
|---|---|---|
| JP | H10-276952 A | 10/1998 |
| JP | 2011-240317 A | 12/2011 |
| JP | 2014-12237 A | 1/2014 |
| JP | 2014-168738 A | 9/2014 |
| WO | 2015/122370 A3 | 2/2015 |
| WO | 2015/102079 A3 | 7/2015 |

* cited by examiner

SURFACE ADHERING MOBILE COATING APPARATUS

CROSS-REFERENCE TO RELATED APPLICATIONS

This is a continuation application of a prior PCT application No. PCT/JP/2017/039841 filed on Nov. 4, 2017.

TECHNICAL FIELD

The present invention relates to a surface adhering mobile coating apparatus; which performs adhering to by an adhering unit such as vacuum or magnet, and travelling on a wall surface or a floor surface or a ceiling surface of the steel structures such as ship hull or various kinds of tanks or bridges or pipes; or which performs adhering to by an adhering unit such as vacuum or magnet, and travelling on a wall surface or a floor surface or a ceiling surface of the concrete structures such as various kinds of tanks or buildings or water tanks or bridges or pipes; which further performs spraying a coating material such as painting material or thermal spraying material onto the surface of the structures.

BACKGROUND ART

As this kind of well-known technology, the "Device capable of suction-adhering to a surface and moving therealong" disclosed in the Japanese patent No. 2689127 and the "Device capable of suction-adhering to a surface and moving therealong" disclosed in the Japanese patent No. 2805614 are known. These patents were invented by the inventor of the present invention.

The device comprises the main casing, the wheels secured to the main casing as a means for mobility, the negative-pressure suction seal connected to the main casing having the peripheral end portion which is caused to contact the surface of an object, the negative pressure forming means to discharge externally the liquid contained in the negative pressure area defined by the main casing, the surface and the negative-pressure suction seal, and the vacuum breaker which makes envelopment fluid flow into the inside of the negative pressure area and maintains the pressure of the area to the predetermined vacuum pressure.

That is, the vacuum breaker is a kind of the relief valve for maintaining vacuum pressure to a fixed degree of vacuum.

The main casing must not necessarily be directly equipped with the relief valve. In the suction hose which connects the main casing, and a negative pressure generation means, the portion close to the main casing of the suction hose may be equipped with the relief valve.

In such a device, the energization of the negative pressure forming means causes the liquid inside the said area to be discharged externally, and the pressure of the liquid that acts on the main casing because of the liquid pressure difference between the inside and the outside of the said area is transmitted to the surface of an object via the wheels, such liquid pressure allowing the device to adhere to the surface.

Additionally, the rotation of the wheels by way of a driving means, such as an electric motor, during such adhesion state allows the device to move along the surface by the action of the wheels.

In this device, various works on the surface of the structures can be performed safely and efficiently by remote control.

[Patent Reference 1] Japan Patent No. 2689127
[Patent Reference 2] Japan Patent No. 2805614

In order to mount a spray unit for spraying a coating material such as a coating material or a thermal spraying material toward the surface of the structure on the "Device capable of suction-adhering to a surface and moving therealong" disclosed in Japan Patent No. 2689127 and Japan Patent No. 2805614, the device need to be configured and operated as follows:

That is, the device must be configured and operated to ensure that the film thickness of the coating material sprayed onto the surface of the structure is uniform.

In recent years, with the emergence of large-scale marine structures, it is difficult to increase maintenance and management costs and secure maintenance personnel.

Therefore, there are increasing applications of ultra-thick film coating systems that have long-term durability even in harsh corrosive environments, and that can apply the ultra-thick films onto the surface of the structure by once application.

These ultra-thick film type coating systems include epoxy resin type, polyurethane resin type and glass flake type.

These ultra-thick film type coating systems are solvent-free or high solid type, and therefore are expected from the viewpoint of the improvement of the global environment by reducing VOC (volatile organic compounds).

As described above, in recent years, the demand for ultra-thick film-type painting has increased, a problem to be solved by the present invention, a film thickness of, for example, 300 µm is secured by one-time spray coating, and to provide a device for securing an uniform final film thickness of 600 µm by superposing them, and to provide a method for operating the apparatus.

SUMMARY OF THE INVENTION

In order to solve the technical problems described above, provided is the device according to an aspect of the invention, comprising:

A surface adhering mobile coating apparatus, comprising; a surface adhering and traveling device which adheres to the surface of the structure by the action of negative pressure or by the other actions to adhere to the surface and which travels along the surface, a spray nozzle for spraying the coating material toward the surface of the structure, and a spray nozzle X-axis drive device for reciprocating the spray nozzle on the X-axis orthogonal to the Y-axis which is a main moving axis line of the surface adhering and traveling device, and a spray nozzle Y-axis drive device for reciprocating the spray nozzle on the Y-axis; further comprising; the spray width of the spray nozzle is wide in the Y-axis direction and the spray width of the spray nozzle is narrow in the X-axis direction;

and the spray width on the Y-axis of the spray nozzle is wider than one working distance on the Y-axis of the spray nozzle Y-axis drive device;

and an operation procedure of the coating by the surface adhering mobile coating apparatus is configured;

First, the spray nozzle sprays a coating material, and moves from the start point to the end point in the forward direction on the X-axis;

Next, the spray nozzle moves from the start point to the end point in the forward direction on the Y-axis while stopping the spraying of the coating material;

Next, the spray nozzle moves from the start point to the end point in the return direction on the X-axis while spraying of the coating material;

Next, the spray nozzle moves from the start point to the end point in the return direction on the Y-axis while stopping the spraying of the coating material;

After or at the same time as the operation that the spray nozzle moves from the start point to the end point in the return direction on the Y-axis while stopping the spraying of the coating material, the whole of the surface adhering mobile coating apparatus travels on the Y-axis the same distance as the approximate distance of the spray width of the spray nozzle;

Next, repeating the above-described operation procedure; further comprising;

Regarding the timing at which the spray command of the coating material is triggered to the spray nozzle when the spray nozzle is moved from the start point to the end point in the forward direction on the X-axis, the timing is the trigger timing at which the spray nozzle leaves the start point in the forward direction on the X-axis, therefore, the timing at which the spray is actually started is slightly delayed from the time when the spray nozzle leaves the start point;

Regarding the timing at which the spray stop command of the coating material is triggered to the spray nozzle when the spray nozzle is moved from the start point to the end point in the forward direction on the X-axis, the timing is the trigger timing at which the spray nozzle reaches the part just before the end point in the forward direction on the X-axis, therefore, the timing at which the spray is actually stopped is slightly delayed from the time when the spray nozzle reaches the part just before the end point;

Regarding the timing at which the spray command of the coating material is triggered to the spray nozzle when the spray nozzle is moved from the start point to the end point in the return direction on the X-axis, the timing is the trigger timing at which the spray nozzle leaves the start point in the return direction on the X-axis, therefore, the timing at which the spray is actually started is slightly delayed from the time when the spray nozzle leaves the start point;

Regarding the timing at which the spray stop command of the coating material is triggered to the spray nozzle when the spray nozzle is moved from the start point to the end point in the return direction on the X-axis, the timing is the trigger timing at which the spray nozzle reaches the part just before the end point in the return direction on the X-axis, therefore, the timing at which the spray is actually stopped is slightly delayed from the time when the spray nozzle reaches the part just before the end point.

The present invention provides the following effects.

That is, in the present invention, a remote control operation is performed, a film thickness of, for example, 300 μm can be secured by one-time spray coating of the ultra-thick film type coating material, further, it is superposed on each other to ensure an uniform final film thickness of 600 μm.

In the present invention, the scaffold is not required to be temporary, the risk of falling of the worker from the scaffold is reduced, the cost can be greatly reduced as compared with a conventional coating system in which a thin film type coating is applied many times, the construction period can be remarkably shortened

DETAILED DESCRIPTIONS OF THE PREFERRED EMBODIMENTS

Preferred embodiments of the device configured according to the present invention will be described in detail below, referring to the figures attached hereto.

Figure 1:
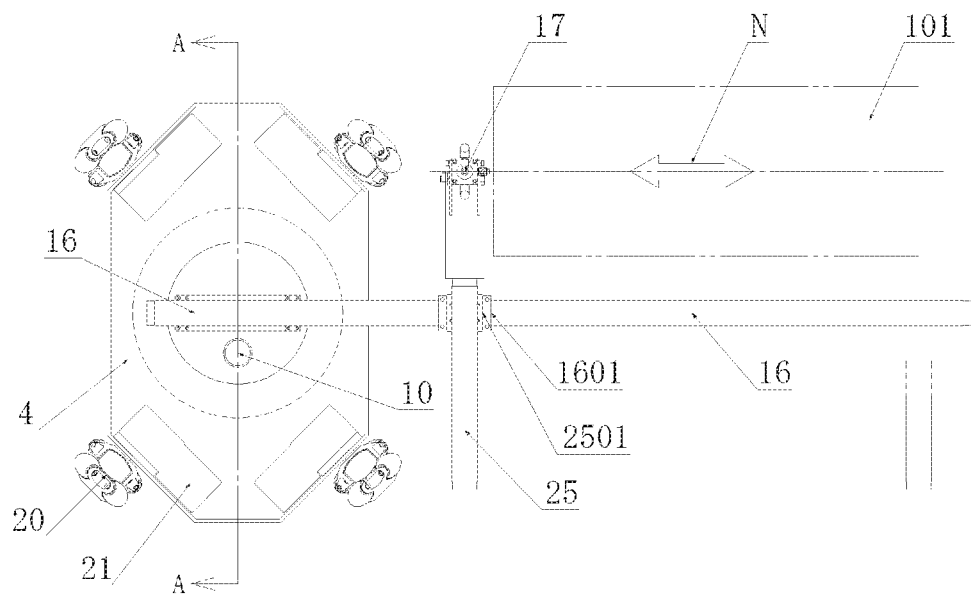
FIG. 1 is a front view illustrating the first preferred embodiment of the apparatus configured in accordance with the present invention.
Figure 2:
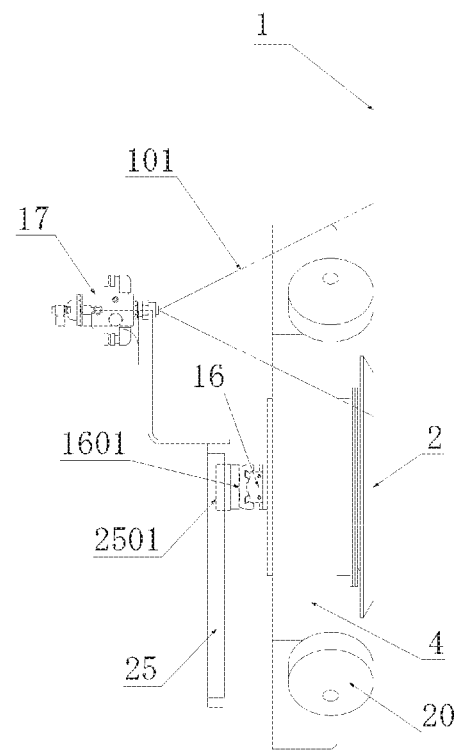
FIG. 2 is a right side view of the apparatus shown in FIG. 1.
Figure 3:
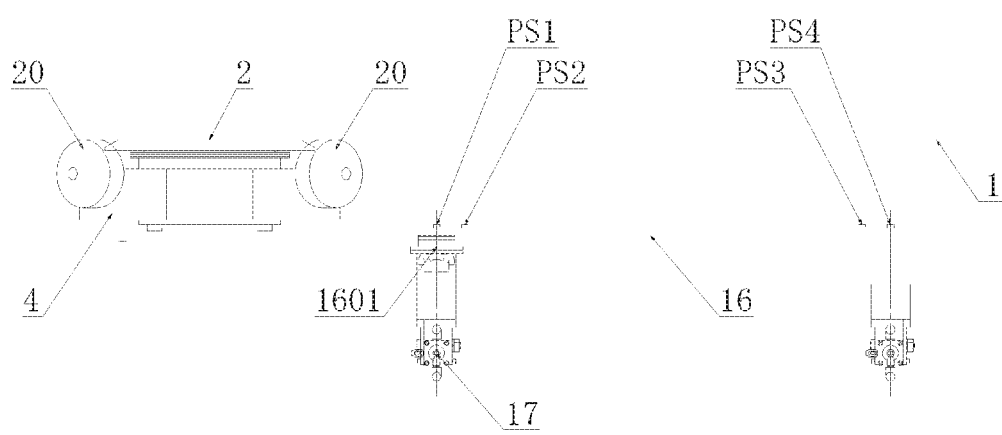
FIG. 3 is a top view of the apparatus shown in FIG. 1.
Figure 4:
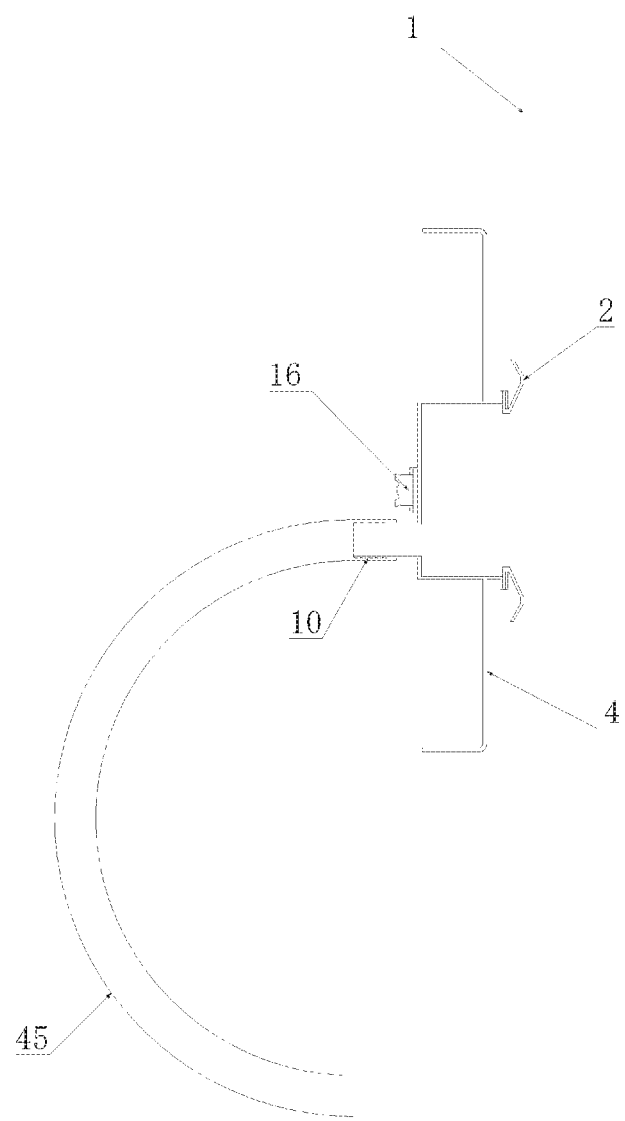
FIG. 4 is a cross-sectional view of A-A in the apparatus shown in FIG. 1.

FIG. 1 illustrates a front view of the device of the first preferred embodiment of the present invention of that view is the view from the direction away from the structure surface 1.

FIG. 1 shows the device is adhering to the structure surface 1 by the action of negative pressure.

In FIG. 1, the surface adhering mobile coating apparatus of the first preferred embodiment is comprised a surface adhering and traveling device which adheres to the surface of the structure by the action of negative pressure, and which travels up, down, rightward or leftward along the structure surface 1.

The surface adhering and traveling device is comprised the spray nozzle 17, the rod-less cylinder 16 as the X-axis drive device for a spray nozzle 17 and the rod-less cylinder 25 as the Y-axis drive device for a spray nozzle 17.

In FIG. 1, the axis in the vertical direction is referred to as the Y-axis, and the axis in the horizontal direction is referred to as the X-axis.

The surface adhering mobile coating apparatus is described below with reference to FIGS. 1 to 10.

The surface adhering and traveling apparatus includes a main frame 4 and four geared motors 21.

Each of the geared motors 21 is attached to each of four corners of the main frame 4.

In FIG. 1, each angle at which the axes line of the output shaft of each geared motor 21 intersects with the Y-axis is as follows. It is set to a position rotated clockwise by 45 degrees, a position rotated clockwise by 135 degrees, a position rotated clockwise by 225 degrees and a position rotated clockwise by 315 degrees.

The output shaft of each of the four geared motors 21 is mounted with a commercially available omni-directional movable omni-wheel.

The device is arbitrarily moved in any one of four directions of upward, downward, leftward and rightward in FIG. 1.

Since the control method of the movement direction by the omni wheel which is a commercial item is publicly known, the description is omitted.

The negative pressure suction seal 2 is attached to the central portion of the main frame 4.

The negative pressure suction seal 2 is annularly formed of polyurethane as a raw material, and has a shape that spreads like a trumpet as it approaches the structure surface 1.

The upstream end of the suction hose 45 is connected to the suction hose joint 10 provided on the main frame 4, and the downstream end of the suction hose 45 is connected to a negative pressure generating means (not shown) such as a vacuum pump.

The cylinder case of rod-less cylinder 16 for driving the spray nozzle in the X-axis is fixed to the main frame 4 of the surface adhering and traveling apparatus, and the moving member 1601 of the rod-less cylinder 16 can reciprocate in the X-axis direction.

The moving member 2501 of the rod-less cylinder 25 for driving the spray nozzle in the Y-axis is fixed to the moving member 1601 of the rod-less cylinder 16, and the cylinder case of rod-less cylinder 25 can reciprocate in the Y-axis direction.

A spray nozzle 17 is fixed to the upper end portion of the cylinder case of the rod-less cylinder 25.

The spray width of the spray nozzle 17 is wide in the Y-axis direction and narrow in the X-axis direction.

From the spray nozzle 17, a coating material such as a paint is jetted toward the structure surface 1 as shown by the imaginary line 101 in FIG. 1.

The spray width on the Y-axis of the spray nozzle 17 is wider than the operation distance on the Y-axis of the rod-less cylinder 25 for driving the spray nozzle 17 on the Y-axis.

The action and effect of the above-described device is described below. When the negative pressure generating means (not shown) is energized, a fluid such as the air inside of the negative pressure suction seal 2 is discharged to the outside through the suction hose (not shown), and as a result, the inside of the negative pressure suction seal 2 is reduced in pressure as desired.

Once the inside of the negative pressure suction seal 2 is thus reduced in pressure, the device adheres to the structure surface 1 by the pressure of the surrounding fluid such as the air acting on the negative pressure suction seal 2, owing to the difference in the fluid pressure between the inside and outside.

When the pressure inside the negative pressure suction seal 2 is maintained at the desired pressure, the negative pressure suction seal 2 is brought into strong contact with the structure surface 1 due to the pressure difference between the inside and the outside of the negative pressure suction seal 2.

Thus, the fluid outside of the negative pressure suction seal 2 is prevented as much as possible from flowing into the inside of the negative pressure suction seal 2.

The coating material such as a paint is sprayed from the spray nozzle 17 toward the structure surface 1.

The spray nozzle 17 reciprocates in the direction intersecting with the traveling direction of the apparatus by the action of the rod-less cylinder 16 for driving the spray nozzle 17 on the X-axis.

The area to be coated in one forward pass or return pass of the spray nozzle 17 is indicated by the spray pattern 101.

The operation procedure of the coating by the surface adhering mobile coating apparatus is described below.

Note that the white arrows indicate the direction in which the spray nozzle 17 moves immediately after the illustration, and the black arrows indicate the direction in which the illustrated device has moved immediately before the illustration.

Figure 5:
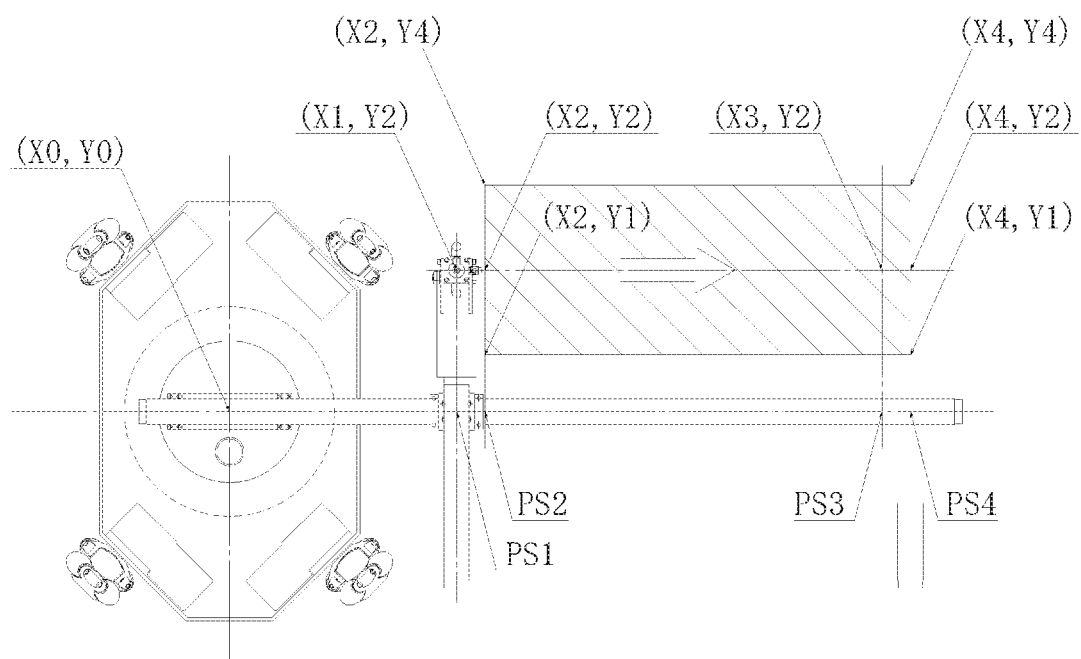
FIG. 5 is a front view illustrating the operational procedure of the coating 1 of the first preferred embodiment that procedure is described in detail with reference to the coordinates.
Figure 6:
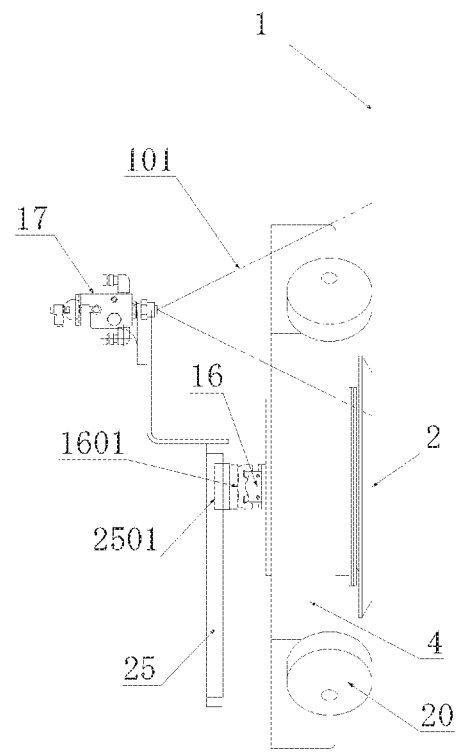
FIG. 6 is a right side view of the apparatus shown in FIG. 5.

First, in FIG. 5, the spray nozzle 17 moves from the starting point (X1, Y2) in the forward direction on the X-axis to the end point (X4, Y2);

Next, the spray nozzle 17 moves from the starting point (X4, Y2) in the forward direction to the end point (X4, Y5) on the Y-axis while stopping the spraying of the coating material; Next, in FIG. 7, the spray nozzle 17 moves from the starting point (X4, Y5) in the backward direction on the X-axis to the end point (X1, Y5); Next, the spray nozzle 17 moves from the starting point (X1, Y5) in the backward direction to the end point (X1, Y2) on the Y-axis while stopping the spraying of the coating material; Next, or simultaneously with the movement from the starting point (X1, Y5) in the backward direction to the end point (X1, Y2) on the Y axis of the spray nozzle, the surface adhering mobile coating apparatus travels on the Y-axis line the distance between the spray width (| Y4−Y1|) and the approximate value on the Y-axis line of the spray nozzle 17;

Next, the above operation procedure is repeated.

In the surface adhering mobile coating apparatus configured as described above;

In FIG. 5, as for the activation timing that the spray command of the coating material is issued to the spray nozzle 17 while the spray nozzle 17 is moving from the starting point (X1, Y2) in the forward direction to the end point (X4, Y2) on the X-axis, it is as follows;

The activation timing of the timing is the time when the spray nozzle 17 separates the starting point (X1, Y2) in the forward direction (the time when the position sensor PS1 is turned off), therefore, the timing at which the spraying is actually started is slightly delayed from the timing at which the spraying starts (X2, Y2). Next, as for the activation timing that the spray stop command of the coating material is issued to the spray nozzle 17, it is as follows;

The activation timing of the timing is the time when the spray nozzle 17 reaches a portion just before the end point (X4, Y2) in the forward direction (when the position sensor PS3 is turned on), therefore, the timing at which the spraying is actually stopped is the point (X4, Y2) slightly delayed from the point (X3, Y2) at which the previous portion is reached.

Figure 7:
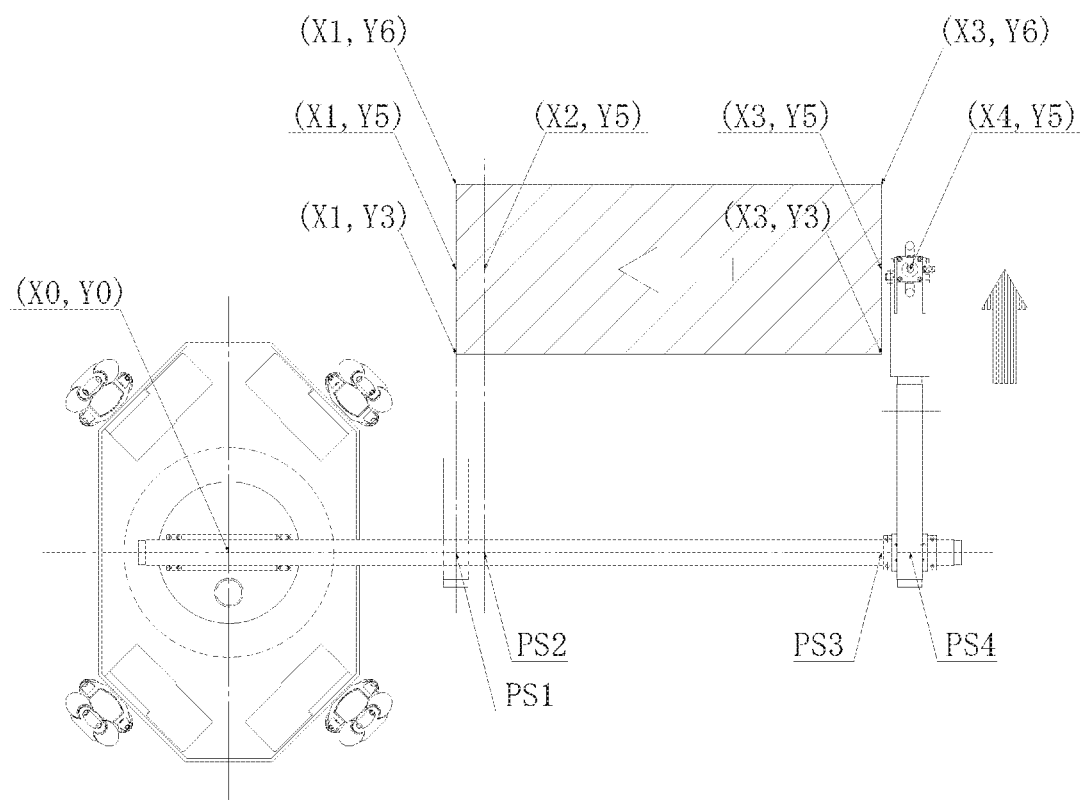
FIG. 7 is a front view illustrating the operational procedure of the coating 3 of the first preferred embodiment that procedure is described in detail with reference to the coordinates.
Figure 8:
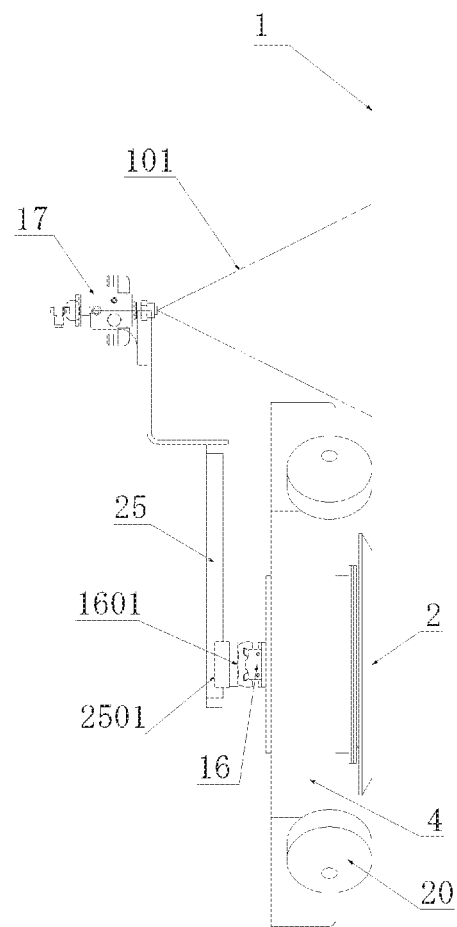
FIG. 8 is a right side view of the apparatus shown in FIG. 7.

In FIG. 7, as for the activation timing that the spray command of the coating material is issued to the spray nozzle 17 while the spray nozzle 17 is moving from the starting point (X4, Y5) in the backward direction to the end point (X1, Y5) on the X-axis, it is as follows;

The activation timing of the timing is the time when the spray nozzle 17 separates the starting point (X4, Y5) in the return direction (when the position sensor PS4 is turned off), therefore, the timing at which the spray is actually started is slightly delayed (X3, Y5) from the time (X4, Y5) at which the separation occurs.

Next, as for the activation timing that the spray stop command of the coating material is issued to the spray nozzle 17, it is as follows;

The activation timing of the timing is the time when the spray nozzle 17 reaches a portion immediately before the end point (X1, Y5) in the return direction (when the position sensor PS2 is turned on), therefore, the timing at which the spraying is actually stopped is a point (X1, Y5) slightly delayed from the point (X2, Y5) at which the previous portion is reached.

Figure 9:
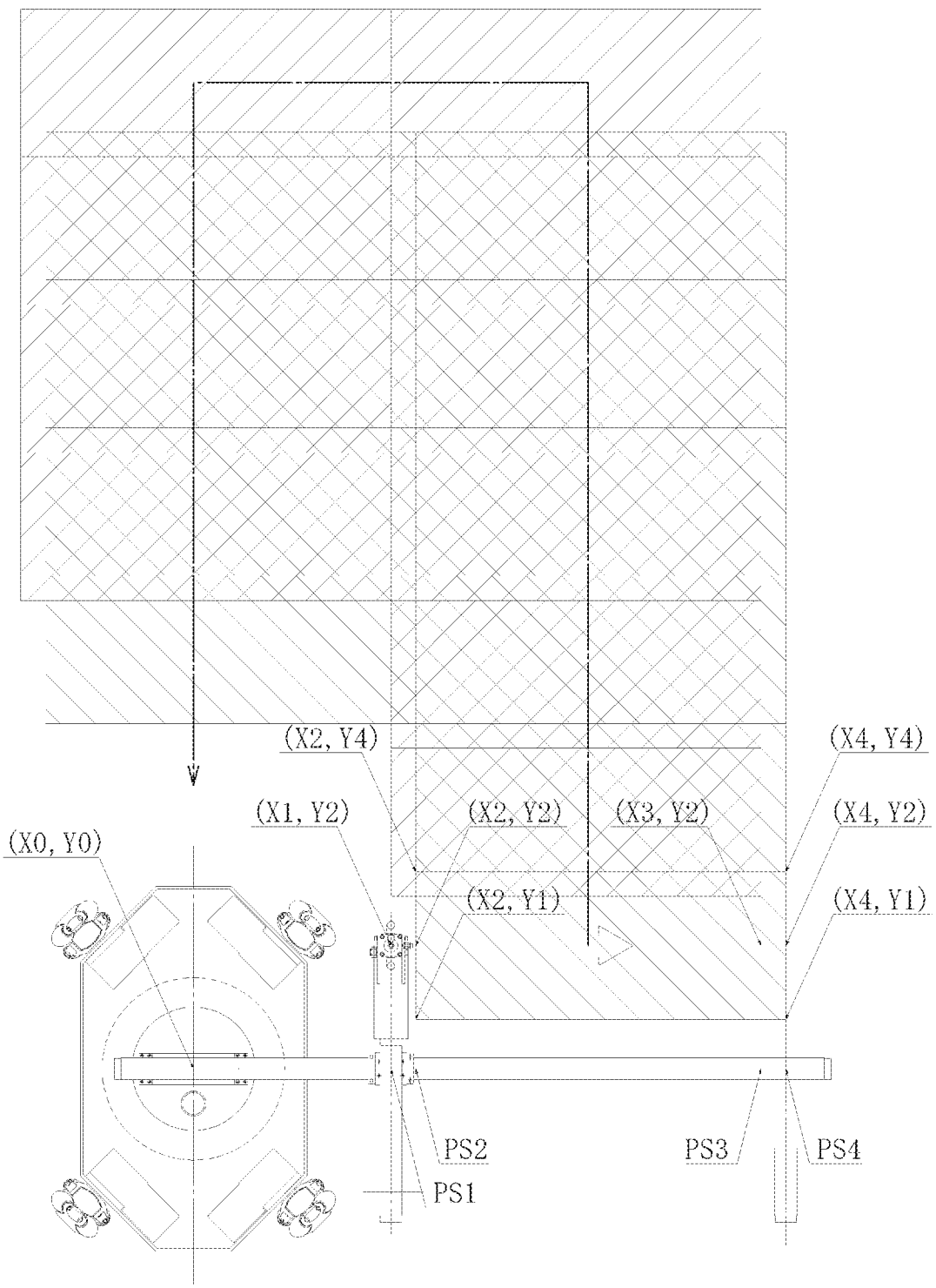
FIG. 9 is a front view illustrating the trajectory of the operational procedure of the coating of the first preferred embodiment that procedure is described in detail with reference to the coordinates.

FIG. 9 illustrates the details of the coating trajectory in the operating procedure of the coating in the first preferred embodiment with coordinates.

In the figure, a single diagonal hatching indicates a portion coated with a single spray (for example, the film thickness is 300 µm) by the spray nozzle, and a double grid hatching is twice coated by the spray nozzle (for example, the film thickness is 600 µm) is shown.

The surface adhering mobile coating apparatus of the present invention makes it possible to perform the coating while repeating traveling up, left, down and right along the structure surface while spraying the coating material onto the structure surface, and makes it possible to perform the coating with the uniform film thickness (for example, the total film thickness is 600 µm by twice coatings) excluding the structure surface of the upper end and the lower end.

Figure 10:
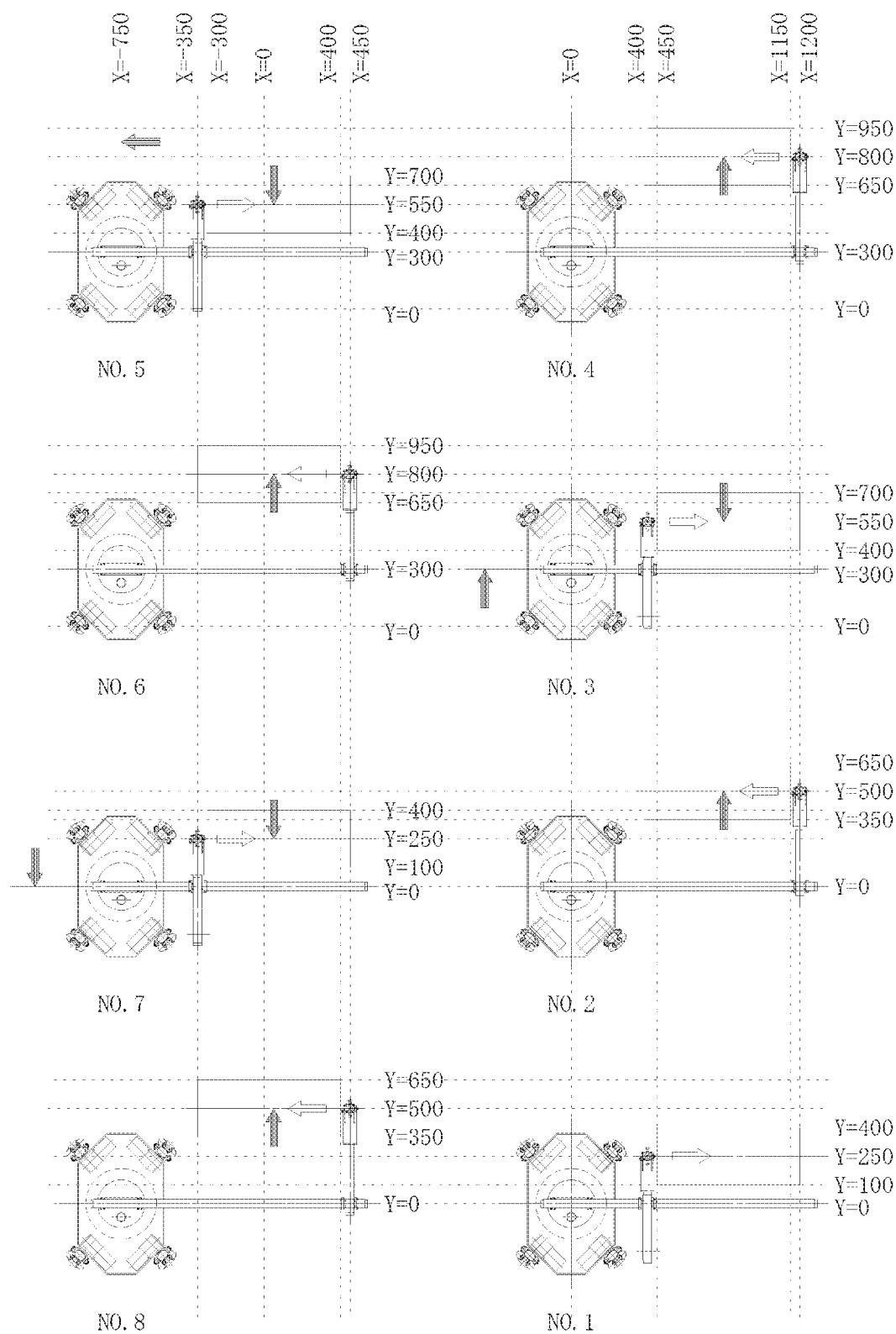
FIG. 10 is a figure illustrating specifically the aspect of device for each process of the operational procedure of the coating of the first preferred embodiment that aspect is described in detail with reference to the concrete coordinates.
Figure 11:
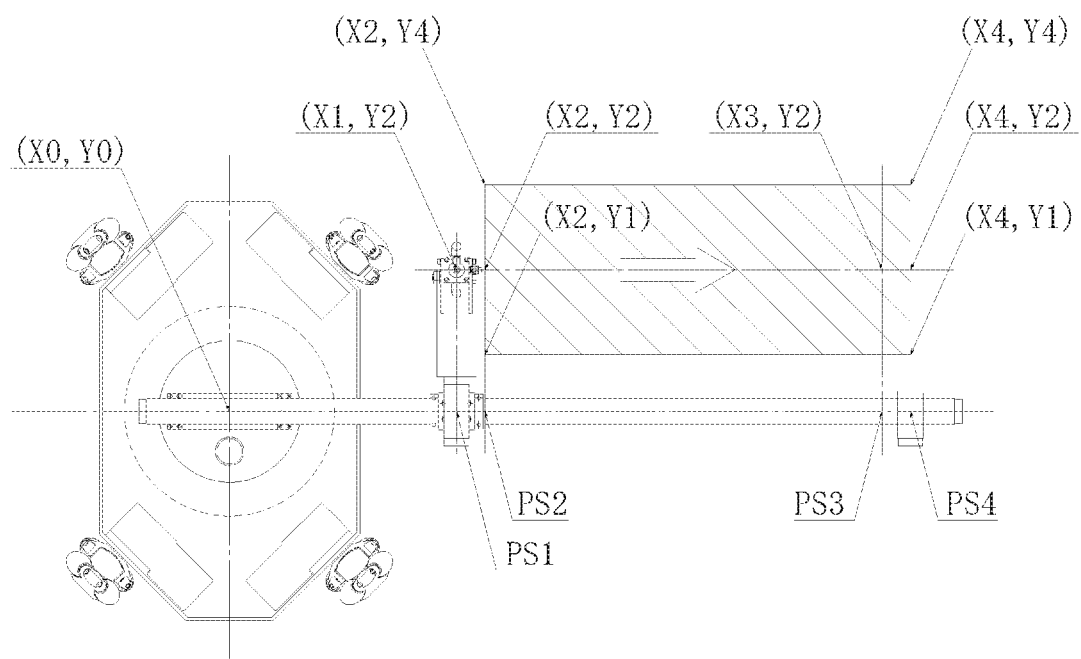
FIG. 11 is a front view illustrating the operational procedure of the coating 1 of the second preferred embodiment that procedure is described in detail with reference to the coordinates.
Figure 12:
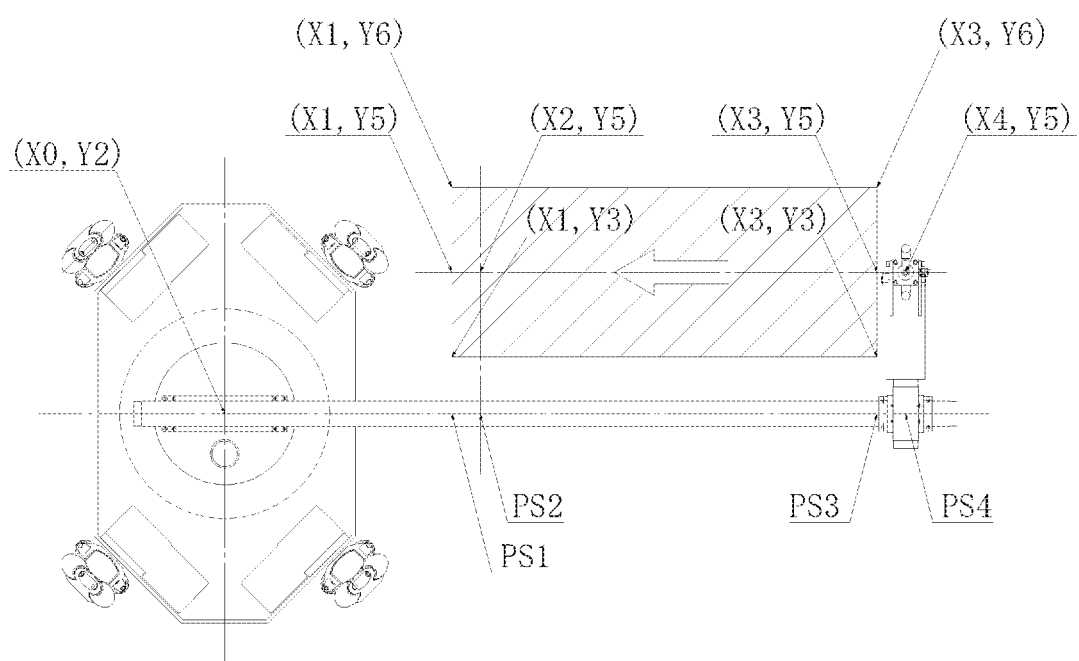
FIG. 12 is a front view illustrating the operational procedure of the coating 3 of the second preferred embodiment that procedure is described in detail with reference to the coordinates.
Figure 13:
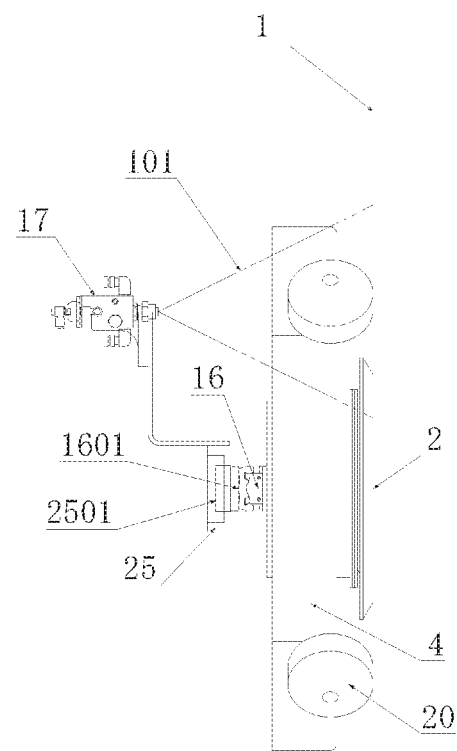
FIG. 13 is a right side view of the apparatus shown in FIG. 11-12.
Figure 14:
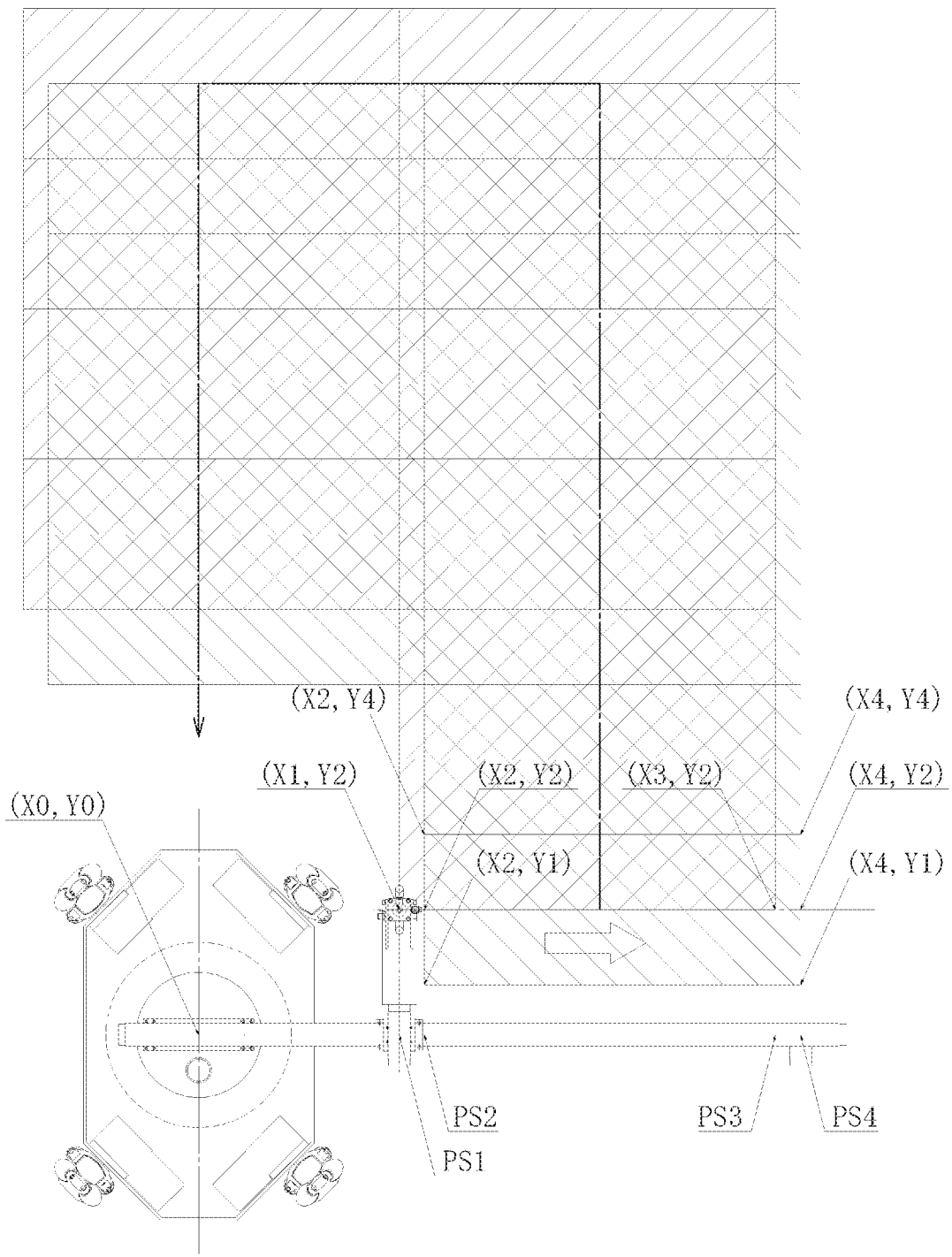
FIG. 14 is a front view illustrating the trajectory of the operational procedure of the coating of the second preferred embodiment that procedure is described in detail with reference to the coordinates.
Figure 15:
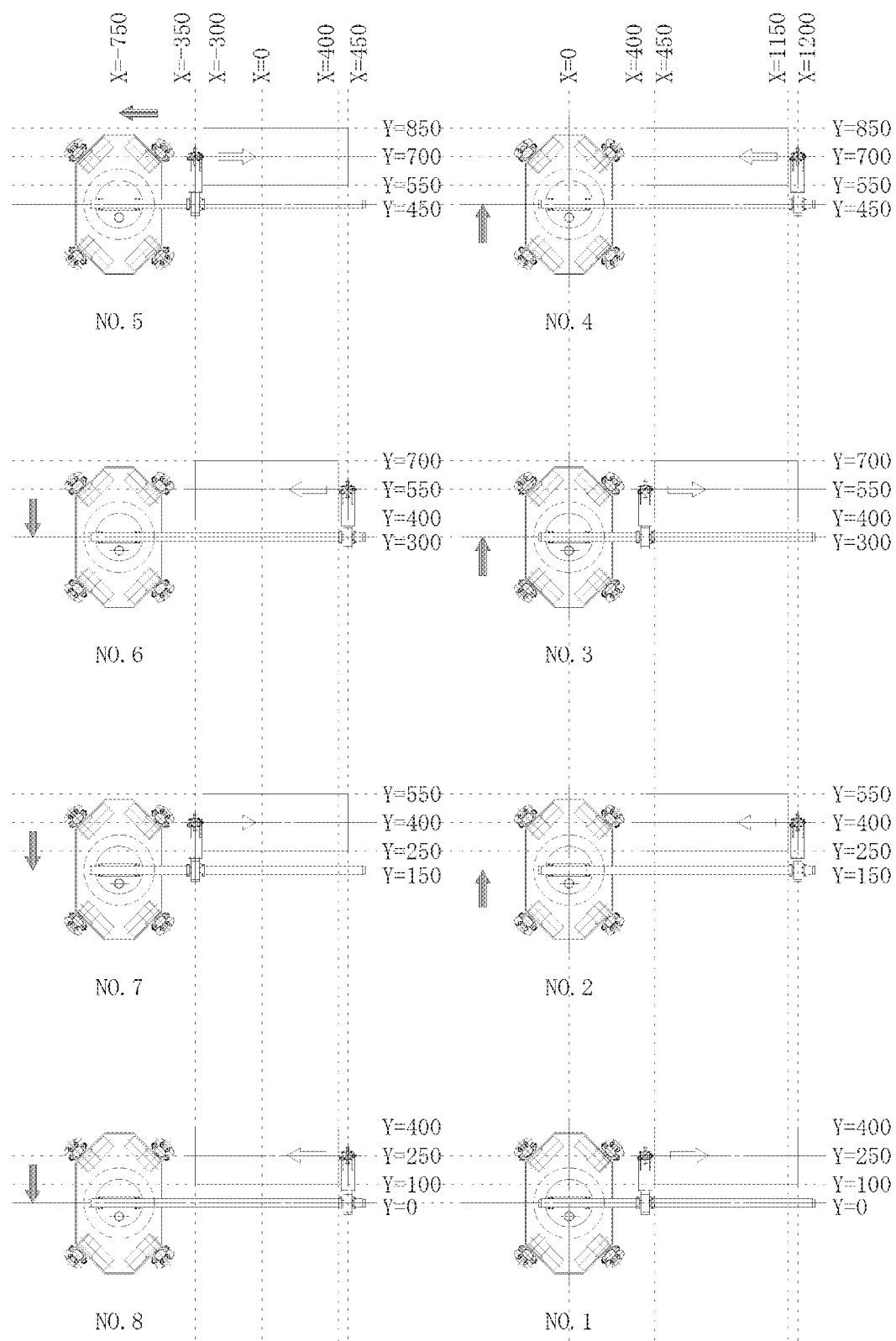
FIG. 15 is a figure illustrating specifically the aspect of device for each process of the operational procedure of the coating of the first preferred embodiment that aspect is described in detail with reference to the concrete coordinates.

FIG. 10 illustrates the aspect of the apparatus for each coating process by showing the concrete example of the coordinates of each coating process in the first preferred embodiment.

The second preferred embodiment of the surface adhering mobile coating apparatus of the present invention is described below with reference to FIGS. 11 to 15.

Regarding the differences between the first preferred embodiment and the second preferred embodiment, the spray nozzle driven unit on the Y-axis is not provided in the second preferred embodiment though the spray nozzle driven unit on the Y-axis is provided in the first preferred embodiment.

The second preferred embodiment uses the traveling function of the surface adhering mobile coating apparatus as the means to drive the spray nozzle 17 in the Y-axis direction instead of the rod-less cylinder 25.

The difference between the first preferred embodiment and the second preferred embodiment is the same except for the above, and the other configuration is the same. Therefore, the description of the overlapping parts is omitted.

The configuration of the second preferred embodiment is described below.

The second preferred embodiment of the surface adhering mobile coating apparatus, comprising; a surface adhering and traveling device which adheres to the surface of the structure by the action of negative pressure or by the other actions to adhere to the surface and which travels along the surface, a spray nozzle for spraying the coating material toward the surface of the structure, and a spray nozzle X-axis drive device for reciprocating the spray nozzle on the X-axis orthogonal to the Y-axis which is a main moving axis line of the surface adhering and traveling device; further comprising;

The spray width of the spray nozzle is wide in the Y-axis direction and the spray width of the spray nozzle is narrow in the X-axis direction;

and an operation procedure of the coating by the surface adhering mobile coating apparatus is configured;

First, the spray nozzle sprays a coating material, and moves from the start point to the end point in the forward direction on the X-axis;

next, the whole of the surface adhering mobile coating apparatus travels on the Y-axis the same distance as the approximate distance of 1/n of the spray width of the spray nozzle;

Next, the spray nozzle moves from the start point to the end point in the return direction on the X-axis while spraying of the coating material;

Next, the whole of the surface adhering mobile coating apparatus travels on the Y-axis the same distance as the approximate distance of (n−1)/n of the spray width of the spray nozzle;

Next, repeating the above-described operation procedure; further comprising;

Regarding the timing at which the spray command of the coating material is triggered to the spray nozzle when the spray nozzle is moved from the start point to the end point in the forward direction on the X-axis, the timing is the trigger timing at which the spray nozzle leaves the start point in the forward direction on the X-axis, therefore, the timing at which the spray is actually started is slightly delayed from the time when the spray nozzle leaves the start point;

Regarding the timing at which the spray stop command of the coating material is triggered to the spray nozzle when the spray nozzle is moved from the start point to the end point in the forward direction on the X-axis, the timing is the trigger timing at which the spray nozzle reaches the part just before the end point in the forward direction on the X-axis, therefore, the timing at which the spray is actually stopped is slightly delayed from the time when the spray nozzle reaches the part just before the end point;

Regarding the timing at which the spray command of the coating material is triggered to the spray nozzle when the spray nozzle is moved from the start point to the end point in the return direction on the X-axis, the timing is the trigger timing at which the spray nozzle leaves the start point in the return direction on the X-axis, therefore, the timing at which the spray is actually started is slightly delayed from the time when the spray nozzle leaves the start point;

Regarding the timing at which the spray stop command of the coating material is triggered to the spray nozzle when the spray nozzle is moved from the start point to the end point in the return direction on the X-axis, the timing is the trigger timing at which the spray nozzle reaches the part just before the end point in the return direction on the X-axis, therefore, the timing at which the spray is actually stopped is slightly delayed from the time when the spray nozzle reaches the part just before the end point.

The apparatus of the preferred embodiment of the present invention and the apparatus of the second preferred embodiment described above have the following effects.

That is, in the present invention, a remote control operation is performed, a film thickness of, for example, 300 µm can be secured by one-time spray coating of the ultra-thick film type coating material, further, it is superposed on each other to ensure the uniform final film thickness of 600 μm.

In the present invention, the scaffold is not required to be temporary, the risk of falling of the worker from the scaffold is reduced, the cost can be greatly reduced as compared with the conventional coating system in which the thin film type coating is applied many times, the construction period can be remarkably shortened.

The preferred embodiments of the apparatus of the present invention have been described above, in addition to the preferred embodiment, various embodiments can be considered in accordance with the claims.

The surface adhering mobile coating apparatus as described above can be advantageously applied to a wide range of applications as the device that performs adhering to by an adhering unit such as vacuum or magnet, and travelling on a wall surface or a floor surface or a ceiling surface of the steel structures such as ship hull or various kinds of tanks or bridges or pipes; or that performs adhering to by an adhering unit such as vacuum or magnet, and travelling on a wall surface or a floor surface or a ceiling surface of the concrete structures such as various kinds of tanks or buildings or water tanks or bridges or pipes; that further performs spraying a coating material such as painting material or thermal spraying material onto the surface of the structures.

What is claimed is:

1. A surface adhering mobile coating apparatus, comprising;
    a surface adhering and traveling device configured to move on a surface of a structure to be coated;
    a spray nozzle for spraying a coating material toward the surface of the structure;
    a spray nozzle X-axis drive device attached to the surface adhering and traveling device and extending in an X-axis direction outside the surface adhering and traveling device;
    a first sensor;
    a second sensor;
    a third sensor;
    a fourth sensor; and
    a spray nozzle Y-axis drive device attached to the surface adhering and traveling device for reciprocating the spray nozzle in a Y-axis direction perpendicular to the X-axis direction,
    wherein said surface adhering and traveling device includes a main frame and a surface adhering portion attached to the main frame for adhering to the surface of the structure,
    said spray nozzle X-axis drive device includes a first cylinder extending in the X-axis direction and a first moving member,
    said spray nozzle Y-axis drive device includes a second cylinder extending in the Y-axis direction and a second moving member,
    said first sensor is attached to the first cylinder at a first position situated outside the surface adhering and traveling device,
    said second sensor is attached to the first cylinder at a second position away from the first position by a first distance and farther than the first sensor from the surface adhering and traveling device,
    said third sensor is attached to the first cylinder at a third position away from the second position by a second distance and farther than the second sensor from the surface adhering and traveling device, and
    said fourth sensor is attached to the first cylinder at a fourth position away from the third position by a third distance and farther than the third sensor from the surface adhering and traveling device, said third distance being substantially equal to the first distance.

2. The surface adhering mobile coating apparatus according to claim 1, wherein said surface adhering portion includes a negative pressure suction seal configured to adhere to the surface of the structure through a negative pressure.

3. The surface adhering mobile coating apparatus according to claim 1, wherein said spray nozzle is configured to spray the coating material in a spray pattern having a width in the Y-axis direction greater than that in the X-axis direction.

4. The surface adhering mobile coating apparatus according to claim 1, wherein said first moving member is configured to move between the first position and the fourth position in the X-axis direction while the spray nozzle is spraying the coating material, and
    said second moving member is configured to move the second cylinder in the Y-axis direction while the spray nozzle does not spray the coating material.

5. The surface adhering mobile coating apparatus according to claim 1, wherein said spray nozzle is configured to start spraying the coating material when the first sensor detects that the first moving member starts moving from the first position toward the fourth position,
    said spray nozzle is configured to stop spraying the coating material when the third sensor detects that the first moving member passes the third position while the first moving member is moving from the first position toward the fourth position,
    said spray nozzle is configured to start spraying the coating material when the fourth sensor detects that the first moving member starts moving from the fourth position toward the first position, and
    said spray nozzle is configured to stop spraying the coating material when the second sensor detects that the first moving member passes the second position while moving from the fourth position toward the first position.

6. The surface adhering mobile coating apparatus according to claim 1, wherein said spray nozzle is configured to start spraying the coating material after a specific time lag when the spray nozzle receives a spray command,
    said spray nozzle is configured to stop spraying the coating material after the specific time lag when the spray nozzle receives a spray stop command, and
    said first moving member is configured to move by the first distance or the third distance during the specific time lag.

* * * * *